United States Patent [19]

Junkermann et al.

[11] 4,157,300
[45] Jun. 5, 1979

[54] PROCESS FOR THE PURIFICATION OF PHENOL AND PHENOL FORMALDEHYDE CONTAINING WASTE WATER

[75] Inventors: Helmut Junkermann; Volker Hafner, both of Frankfurt, Fed. Rep. of Germany

[73] Assignee: Deutsche Gold- und Silber-Scheideanstalt vormals Roessler, Frankfurt, Fed. Rep. of Germany

[21] Appl. No.: 857,356

[22] Filed: Dec. 2, 1977

[30] Foreign Application Priority Data

Dec. 17, 1976 [DE] Fed. Rep. of Germany ....... 2657192

[51] Int. Cl.$^2$ ........................... C02B 1/14; C02B 1/36
[52] U.S. Cl. ...................................... 210/40; 210/62; 210/63 R; 260/702
[58] Field of Search ..................... 210/39, 40, 59, 62, 210/63 R, 63 Z, 50; 260/702, 708

[56] References Cited

U.S. PATENT DOCUMENTS

| | | | |
|---|---|---|---|
| 2,323,594 | 7/1945 | Hampel | 23/152 |
| 2,367,771 | 1/1945 | Hampel | 8/105 |
| 2,430,674 | 11/1947 | Hampel | 127/46 |
| 2,430,675 | 11/1947 | Hampel | 260/423 |
| 2,452,928 | 11/1948 | Hampel | 210/28 |
| 2,452,970 | 11/1948 | Vincent | 210/28 |
| 2,452,971 | 11/1948 | Vincent | 210/28 |
| 3,386,915 | 6/1968 | Rutschi | 210/62 |
| 3,531,463 | 9/1970 | Gustafson | 260/211.5 |
| 3,574,052 | 4/1971 | Westerlund | 162/77 |
| 3,617,582 | 11/1971 | Lawes | 210/63 |
| 3,635,817 | 1/1972 | Zuckerman | 210/40 |
| 3,663,467 | 5/1972 | Albright | 260/2.5 B |
| 3,733,266 | 5/1973 | Bishop | 210/40 |
| 4,013,761 | 3/1977 | Ward | 210/62 |

FOREIGN PATENT DOCUMENTS

| | | | |
|---|---|---|---|
| 2425319 | 12/1974 | Fed. Rep. of Germany | 210/62 |
| 2404264 | 7/1975 | Fed. Rep. of Germany. | |
| 532575 | 8/1974 | U.S.S.R. | 210/63 R |
| 141814 | 12/1976 | U.S.S.R. | |

OTHER PUBLICATIONS

Stepanyan et al., Int. Chem. Eng., vol. 12 (1972) No. 4, pp. 649–651.
J. F. White, Ind. Eng. Chem., vol. 34, Jul. 1942, pp. 782–792.
F. Meinch et al., "Industrie-Abwasser," 4th Ed. (1968), p. 619.
Gesundh. Ing., vol. 81 (1960) pp. 205 et seq.
H. Thieleman, Gesundh. Ing., vol. 92 (1971) No. 10, pp. 295–299.
Chemical Abstracts (1969) vol. 71, 83221s (Klossowski).
Chemical Abstracts (1973) vol. 79, 23266m.
T. Nash, Nature (London) vol. 1970 (1952) p. 976.

Primary Examiner—Charles N. Hart
Assistant Examiner—Ernest G. Therkorn
Attorney, Agent, or Firm—Cushman, Darby & Cushman

[57] ABSTRACT

Phenol or phenol-formaldehyde containing waste water is purified with chlorine dioxide by treating the waste water with alkali or alkaline earth metal chlorite in the presence of formaldehyde and the weight ratio of formaldehyde to phenol is between 0.5 to 2:1 and the mole ratio of the sum of phenol + formaldehyde to chlorite is between 1:1.2 to 1:2, whereupon the treated water is decolorized, in a given case in known manner.

12 Claims, No Drawings

PROCESS FOR THE PURIFICATION OF PHENOL AND PHENOL FORMALDEHYDE CONTAINING WASTE WATER

BACKGROUND OF THE INVENTION

Phenol containing waste water of different concentrations occur in the synthesis of phenol, in coke oven plants and gas making plants, in lignite carbonization and, not of least importance, in the production of phenolformaldehyde resins (phenoplasts).

The removal of toxic phenol without residue and also the removal of the likewise toxic formaldehyde from waste waters of the above-mentioned branches of industry, particularly for a subsequent biological clarification of such waste water is now as ever a very important problem which until now has not been able to be solved satisfactorily within a large range of concentration.

In the mentioned phenoplasts for example in the so-called "reaction waters" which according to the condensation process can react either alkaline or acid, there can be present a content of volatile phenol in the range of 1,700 to 15,000 mg/l and of free formaldehyde between 1,200 and 8,000 mg/l (F. Meinck, H. Stoff, H. Kohlschütter, "Industrie-Abwasser," 4th edition, Gustav Fischer-Verlag, Stuttgart, 1968 page 619).

There are already a large number of processes for the purification of phenol containing waste water which, however, are not universally usuable over a large range of concentrations.

At high phenol concentrations, for example, for the purpose of recovery of phenol, a steam distillation can be suitable. Besides, there is a series of extraction processes in which an extraction of the phenol is undertaken with the help of, for example, benzene, toluene or tricresyl phosphate. Attendant on this process is the disadvantage that certain residual parts of the extraction agent enter the waste water; besides, the so-called "Degree of Washing" of the various processes is different so that it is not possible to remove the phenol without residue.

A total removal of phenol can be produced by evaporation of the waste water and burning of the residue. However, this process requires a high expenditure of energy.

At low phenol concentrations it is possible to remove a sufficient amount of phenol also with help of special activated carbon, but the effect depends on the amount of carbon, type and granulation as well as the process (duration of the action, pH and temperature of the waste water).

According to the composition and concentration of the phenol containing waste water the effect of the adsorption is very different and at average and high concentrations too expensive, e.g., from 1,000 ppm and higher.

A further adsorption process consists of the use of specific synthetic resins, e.g., polymethacrylates or polyvinyl benzenes. Thus, the phenol content in a phenol containing waste water can be reduced from 6,700 ppm to about 0.1 ppm (Albright U.S. Pat. No. 3,663,467 and Gustafson U.S. Pat. No. 3,531,463).

However, this type of adsorption process cannot be used in phenol-formaldehyde containing waste waters of the synthetic resin industry because in the thus treated waste water just as before the toxic formaldehyde remains behind.

Sporadically the phenol rich waste water can also be treated biologically according to the "Nocardia Process". Pure cultures such as organisms closely related to actinomyces are colonized in trickling filters or activated sludge plants.

In favorable cases a purification effect of 99% can be produced so that even with biological breakdown there always remains a certain residual amount.

The effect depends on the remaining conditions, thus the flora is severely injured by a too great amount of phenol or by other waste water poisons and eventually even destroyed.

The process therefore produces no guarantee for waste water detoxification.

Besides, for adopting such a special biological turf or activated sludge there must be added N and P containing nutrient salts (Gesundh. Ing. Vol. 81 (1960) pages 205 et seq.). This procedure requires the relatively expensive operation of a special biological clarification plant.

A well known process is the oxidation of phenol by means of chlorine dioxide. Chlorine dioxide is obtained either through the action of acids on chlorites, preferably sodium chlorite, or also by reaction of chlorine with sodium chlorite in, e.g., sulfuric acid medium.

However, in the last process there is the danger of chlorination of the phenol to the still more toxic chlorophenols. Besides, the oxidation does not go one hundred percent. This is true even for the development of chlorine dioxide by the action of acids on chlorites. Here also a substantial oxidation can be produced. However, our experiments of this type show, as can be seen from gas chromatographic analysis of this type of treated waste water, that after the oxidation there was always still present a greatly varying residual content of phenol in order of between more than 10 to above 100 ppm. Besides, these occurs in the gas chromatogram foreign peaks which have not been previously identified, from which it can be assumed that it is a matter of intermediate oxidation products (quinones, hydroquinones or eventually even chlorinated products) (see also H. Thieleman, Gesundh. Ing. Vol. 92 (1971) No. 10 page 297).

Also, there should not be disregarded the corrosion problems which occur in the strong acidification of the waste water.

According to data in the literature (Klossowski, Jerzy, Gaz, Woda Tech. Sanit. (1968) Vol. 42 pages 197–200) phenol and its derivatives are decomposed only in an amount of 83% by gaseous chlorine dioxide which is developed from sodium chlorite and sulfuric acid.

The oxidation of phenol by chlorine dioxide in the acid or neutral range should lead to p-benzoquinone as the end product of the phenol oxidation, while in alkaline medium by a high excess of chlorine dioxide (5 mg $ClO_2$ to 1 mg phenol) there is formed a mixture of organic acids, chiefly maleic and oxalic acids (Chemical Abstracts, Vol. 79, 23266 m).

In Russian Patent 141,814 there is described the purification of waste waters of phenol-formaldehyde resin production wherein formaldehyde is removed by treatment of the water with quicklime at room temperature or at 98° C. and phenol is removed by oxidation either electrochemically or with $MnO_2$. This process is relatively expensive. By quicklime is meant calcium hydroxide.

In another process the waste water purification from phenol, methanol and formaldehyde is undertaken by means of a so-called "Liquid Phase Oxidation" (I. S. Stepanyan, I. A. Vinokur, G. M. Padaryan, khim. prom (1972) Vol. 6 pages 30–31 or Int. Chem. Eng. Vol. 12 (1972) No. 4 pages 649–651). In this process, the waste water is nozzled into an electrically heated reactor by means of air under 40 bar pressure and at 200° C. However, test data have only given a degree of oxidation around 95% for phenol, 77% for methanol and 93% for formaldehyde.

In another series of experiments, the degree of oxidation is only 80% for the named substances. The process is industrially very expensive. There remains a residual amount of the toxic acting materials.

In German OS No. 2,404,264 there is described a process for the preliminary purification of waste water from phenol, formaldehyde and their reaction products after which there is added to the waste water soluble aminoplast resin precondensates or their aqueous solutions. The reaction mixture is held at the boiling temperature in the alkaline range for 2 to 8 hours, subsequently neutralized and the precipitated reaction product separated.

As can be seen from the examples with this process there can merely be produced a preliminary purification of such waste water; a complete removal of phenol and formaldehyde is impossible.

To be sure chlorine dioxide is preferred for industrial processes as the oxidation agent. Only it cannot be produced according to the previously described processes since then the oxidation does not proceed completely.

However, on the other hand, chlorine dioxide must be produced just before its use for safety reasons, because it cannot be stored as a supply. The direction production of chlorine dioxide according to the processes mentioned, however, cannot be adjusted to the particular demand. In production of chlorine dioxide in a so-called "Chlorine Dioxide Plant" there is not excluded the possibility of the formation of a strong excess of chlorine dioxide. This means an inadmissibly high loading of the waste water with the chlorine dioxide likewise strongly toxic to the activated sludge. Besides, here also the oxidation does not proceed completely.

The object of the invention, therefore, is the complete elimination of phenol from waste water in an industrially simple manner.

SUMMARY OF THE INVENTION

It has now been found that phenol or phenolformaldehyde containing waste water can be freed safely and quantitatively from phenol with chlorine dioxide if this waste water is treated with alkali or alkaline earth chlorites in the presence of formaldehyde and the weight ratio of formaldehyde to phenol is between 0.5 to 2:1 and the mole ratio of the sum of phenol+formaldehyde to chlorite is between 1:1.2 to 1:2 when the chlorite is an alkali metal chlorite and between 1:0.6 to 1:1 when the chlorite is an alkaline earth metal chlorite, whereupon the treated waste water is decolorized, in a given case in known manner.

Surprisingly, it was found that no chlorine was produced in the chlorine dioxide formation with this process. Besides, the chlorine dioxide formed never reaches the solubility limit and therefore does no gaseous form escape.

However, the phenol and formaldehyde present are quantitatively detoxified or oxidized. Phenol is present thereby in the waste water generally in an amount between 0.01 and 1 weight %. However, there can also be detoxified waste water with still smaller amounts of phenol according to the process of the invention.

The process is also usable without need for modification to purify waste water with phenol contents above 1 weight % but with such large amounts of phenol it is preferable to recover it.

To be sure the chemical reaction as such, thus the reaction of chlorites with aldehydes, among others formaldehyde, is already mentioned, see J. F. White, Ind. Eng. Chem. Vol. 34 July 1942, pages 782–792, particularly page 789.

However, since formaldehyde itself is a waste water poison, it was thought to be full of risk to carry out a detoxification method for phenol with the assistance of formaldehyde.

This proceeds from the fact that previously the detoxification of phenol and formaldehyde containing waste waters by chlorine dioxide or chlorite was tried in acid medium or by entirely divergent methods, see the state of the art as set forth above.

However, it has been surprisingly shown that in observing the above-mentioned molar ratios, the formaldehyde as well as the phenol is oxidized quantitatively. Thereby there does not occur, as the gas chromatograph has shown, formation of intermediate products or chlorinated phenols, which then remain in the waste water.

The reaction proceeds quickly at higher phenol concentrations, i.e., from 0.5 weight %, i.e., between 30 and 60 minutes at normal temperature (20°–25° C.).

As alkali or alkaline earth metal chlorites most important are sodium, potassium or calcium chloride, preferably in their commercial forms. Other alkali and alkaline earth metal chlorites include barium chlorite and lithium chlorite.

Sodium chlorite is most preferred.

Sodium chlorite is used as a 10 to 40 weight % aqueous solution, preferably as a 30 weight % solution. The other chlorites can similarly be used in aqueous solution. The named chlorites can also be added in solid form.

The formaldehyde is present already either partially or completely in the waste water to be treated. Else, thus even in detoxification of pure phenol containing waste water, it is likewise added to the waste waters as a commercial aqueous solution, e.g., as a 37 to 50 weight % solution, preferably, however, as a 30 weight % solution.

A preferred weight ratio of formaldehyde to phenol is 1:1 referred to normal temperature (20°–25° C.).

A very favorable molar ratio of the sum of phenol and formaldehyde to chlorite is at 1:1.5 referred to normal temperature.

However, if the detoxification of the waste water is not carried out at normal temperature but the waste water is preheated to higher temperatures such as 40° to 60° C., the reaction is accelerated, see Example 3.

This is particularly favorable if the detoxification of the invention is preceded by a phenol removal through distillation.

The pH of the waste water to be treated generally should be between 4.5 and 9, preferably between 5 and 8.

The detoxification takes place while the waste water is moved, e.g., by stirrers, shakers or vibrators.

If the required amount of formaldehyde is already present in the waste water, there need only be added the chlorite, otherwise both formaldehyde and chlorite.

The sequence of adding the two materials is immaterial since the detoxification is independent thereof.

In a given case it can even be necessary that chlorite be added very slowly, since in every case there must be avoided the development of gaseous chloride dioxide.

At high phenol concentrations, from 0.5 weight % (5,000 ppm) and higher the oxidation reaction begins within 8 to 15 minutes, recognized by the solution becoming turbid and the yellow color because of the formation of $ClO_2$. The temperature increases. Thereby small amounts of resinous, yellow colored products of undetermined constitution separate.

If the reaction in the slow addition of sodium chlorite to the mixture of phenol and formaldehyde is followed potentiometrically there is recognized in the diagram that first after development of chlorine dioxide phenol is oxidized, only subsequent thereto the oxidation of the formaldehyde takes place.

In the addition of sodium chlorite is discontinued immediately after oxidation of the phenol, there is found in the thus treated waste water practically only formaldehyde.

The total oxidation of phenol+formaldehyde is finished within 30 to 100 minutes; the duration of the reaction is reversely proportional to the amount of formaldehyde.

After separation of the separated resinous product the still yellow-orange colored solution is decolored by addition of 2-3% of decolorizing carbon, based on the amount of waste water, and allowing it to stand 15-30 minutes. The filtrate obtained is colorless or colored weakly yellow.

The testing for phenol and eventual derivatives (quantitative determination) is carried out gas chromatographically. Conditions: Gas chromatograph Perkin-Elmer F7 with FID. Temperature of the column 180° C., injection block 230° C., flow about 24 ml/min, column 1 meter Porapack P, No. 85. Amount of sample 1μ liter/min. Paper feed 0.5 cm/min.

The analysis of the formaldehyde was accomplished colorimetrically by means of the very sensitive condensation reaction between formaldehyde, acetyl acetone and ammonia or ammonium acetate to the yellow colored diacetyl dihydrolutidine (T. Nash, Nature (London) Vol. 170 (1952) page 976).

The gas chromatographic analysis showed that phenol was only still present in traces which could not be determined quantitatively or was completely eliminated. Also, the fomaldehyde was completely eliminated.

At lower phenol concentrations of 0.2%, the reaction lasts at normal temperature for about 60–80 minutes, the increase in temperature is less. Upon heating the phenolformaldehyde containing waste water to 40° C. before addition of the chlorite the reaction time is shortened to 30–40 minutes. In both cases the course is the same as previously given. An addition of 1% of decolorizing carbon is sufficient to decolorize the treated waste water.

For the purpose of decolorizing the treated waste water can also be sent over a column filled with decolorizing carbon. The eluate obtained is colorless and likewise free from phenol and formaldehyde.

At still lower phenol concentrations of 0.1% and below the reaction mixture can be heated to about 45° C. if the reaction should proceed within the shorter time of 30–60 minutes. The course is the same as previously described.

In the treatment of waste waters with very low phenol concentrations below 0.1%, e.g., in the range of 100–500 ppm, it is possible to adjust the waste water which after addition of sodium chlorite in this case is strongly alkaline to neutral or weakly alkaline by addition of small amounts of acid and then leave it stand at normal temperature for a longer time. The formation of chlorine dioxide proceeds more or less quickly depending on the concentration of phenol; the waste water can then be let stand by itself for several hours to 1 day and then, as already previously given, correspondingly worked up.

Here also after the oxidation only a slight addition of decolorizing carbon, in the order of maximally 1%, is needed for removal of coloring constituents.

The colorless filtrates obtained are completely free of phenol and formaldehyde. Even the oxidizing agents as, e.g., chlorine dioxide or chlorite, are no longer present.

Generally, the pH range of the thus treated waste water is between 4.0 and 7.0, according to the phenol concentrations employed. At higher phenol concentrations it is weakly acid, at lower phenol concentrations in the neutral range.

In the following examples the process will be explained further.

Unless otherwise indicated, all parts and percentages are by weight.

The process can comprise, consist essentially of or consist of the steps set forth and the materials employed can comprise, consist essentially of or consist of those set forth.

DESCRIPTION OF THE PREFERRED EMBODIMENTS

EXAMPLE 1

In each case different amounts of formaldehyde solution were added to phenol containing waste water samples having a phenol content of 0.8% (8,000 ppm) at normal temperature (20°–25° C.) wherein the concentration of the formaldehyde amounted to 0.5 to 2.0%. Subsequently, there were added the corresponding amounts of aqueous 30% sodium chlorite solution.

After mixing of the additive there occurred within the shortest time a yellow coloration, i.e., formation of chlorine dioxide. The oxidation reaction with an increase in temperature was ended after 30 to exactly 60 minutes.

The gas chromatographic analysis of the different additives showed that phenol could no longer be determined quantitatively, but merely was present in traces below 5 ppm. Also, formaldehyde was practically completely eliminated.

The following table gives information of the experimental results. Thereby number (1) means the amounts of additive based on 1 liter of waste water and number (2) means an aqueous solution of 300 grams of sodium chlorite in 1 liter of solution.

| Waste Water with a Phenol Content of 0.8% (85 mMol/l) | | | | | | | | |
|---|---|---|---|---|---|---|---|---|
| Addition of Formaldehyde Solution (1) | | Consumption of Chlorite (2) | | Mole Ratio (CH$_2$O+PhOH): NaClO$_2$ | Reaction Time Minutes | Temperature Increased °C. | Analysis of the Treated Waste Water | |
| Conc. % | mMol/l | ml$^{(1)}$ | mMol/l | | | | Phenol ppm | CH$_2$O ppm |
| 2.0 | 670 | 290 | 960 | 1 : 1.3 | 52 | 52 | <5 | <10 |
| 1.5 | 500 | 225 | 745 | 1 : 1.3 | 44 | 50 | <5 | <10 |
| 1.0 | 333 | 155 | 513 | 1 : 1.2 | 32 | 47 | <5 | 0 |
| 0.5 | 167 | 98 | 323 | 1 : 1.3 | 30 | 40 | <5 | <10 |

EXAMPLE 2

There were added to waste water samples with a phenol content of 0.5% different amounts of formaldehyde solution (concentration between 0.25–2.0%) and subsequently the required amounts of chlorite solution. After mixing, here also the oxidation reaction began within a short period of time.

In the following table there are given the conditions and analytical results of the treated samples. Here also the oxidation results in a practically total elimination of the phenol as well as the formaldehyde.

| Waste Water with a Phenol Content of 0.5% (53 mMol/l) | | | | | | | | |
|---|---|---|---|---|---|---|---|---|
| Addition of Formaldehyde Solution (1) | | Consumption of Chlorite (2) | | Mole Ratio (CH$_2$O+PhOH): NaClO$_2$ | Reaction Time Minutes | Temperature Increased °C. | Analysis of the Treated Waste Water | |
| Conc. % | mMol/l | ml$^{(1)}$ | mMol/l | | | | Phenol ppm | CH$_2$O ppm |
| 2.0 | 670 | 330 | 1099 | 1 : 1.5 | 100 | 49 | <5 | 0 |
| 1.5 | 500 | 240 | 794 | 1 : 1.4 | 78 | 42 | <5 | 30 |
| 1.0 | 333 | 200 | 666 | 1 : 1.7 | 69 | 41 | <5 | <10 |
| 1.0 | 333 | 158 | 521 | 1 : 1.4 | 35 | 44 | 0 | 0 |
| 0.5 | 166 | 90 | 298 | 1 : 1.4 | 45 | 36 | <5 | <10 |
| 0.25 | 83 | 85 | 281 | 1 : 2.0 | 60 | 30 | <5 | 0 |

EXAMPLE 3

In an analogous manner there were treated waste water samples with a phenol content of 0.2% both at normal temperature (20°–25° C.) and also by heating to 40° C. before addition of sodium chlorite.

The following table shows the results. At normal temperature phenol was eliminated within 60–80 minutes. Residual amounts of formaldehyde were still present at high formaldehyde excesses of 0.5 and 1.0%. In the hot the reaction ran to practically complete elimination of phenol and formaldehyde, even at the high formaldehyde concentrations within 30 to 40 minutes.

| Waste Water with a Phenol Content of 0.2% (21 mMol/l) | | | | | | | | |
|---|---|---|---|---|---|---|---|---|
| Addition of Formaldehyde Solution (1) | | Consumption of Chlorite (2) | | Mole Ratio (CH$_2$O+PhOH): NaClO$_2$ | Reaction Time Minutes | Temperature Increased °C. | Analysis of the Treated Waste Water | |
| Conc. % | mMol/l | ml$^{(1)}$ | mMol/l | | | | Phenol ppm | CH$_2$O ppm |
| 1.0 | 333 | 175 | 579 | 1 : 1.6 | 78 | 38 | <5 | 800 |
| 0.5 | 166 | 89 | 294 | 1 : 1.6 | 47 | 34 | 0 | 880 |
| 0.2 | 67 | 45 | 149 | 1 : 1.7 | 60 | 31 | <5 | 20 |
| Heating of the Phenol-/Formaldehyde Containing Waste Water Before Clorite Addition to 40° C. | | | | | | | | |
| 1.0 | 333 | 175 | 579 | 1 : 1.6 | 40 | 51 | <5 | 10 |
| 0.5 | 166 | 89 | 294 | 1 : 1.6 | 36 | 49 | <5 | 0 |
| 0.2 | 67 | 45 | 149 | 1 : 1.7 | 30 | 45 | <5 | 0 |

EXAMPLE 4

Waste water samples having a phenol content of 0.1% were treated analogous to the preceding examples with formaldehyde and chlorite solutions. Amounts and concentrations of the additives are as set forth in the following table. The treatment of the waste water was carried out both at room temperature and also by heating to 40° C. before addition of the chlorite solution. Naturally the duration of the reaction at normal temperature is retarded; its takes up to four hours; with heating only half an hour. In both cases in regard to the complete elimination of phenol and formaldehyde there were obtained equally good results.

| Waste Water with a Phenol Content of 0.1% (10.6 mMol/l) | | | | | | | | |
|---|---|---|---|---|---|---|---|---|
| Addition of Formaldehyde Solution (1) | | Consumption of Chlorite (2) | | Mole Ratio (CH$_2$O+PhOH): NaClO$_2$ | Reaction Time Minutes | Temperature Increased °C. | Analysis of the Treated Waste Water | |
| Conc. % | mMol/l | ml$^{(1)}$ | mMol/l | | | | Phenol ppm | CH$_2$O ppm |
| 0.2 | 66 | 46 | 153 | 1 : 2.0 | 165 | 30 | 0 | 0 |
| 0.1 | 33 | 23 | 76 | 1 : 1.7 | 185 | 27 | 0 | 0 |

-continued

| Waste Water with a Phenol Content of 0.1% (10.6 mMol/l) | | | | | | | | |
|---|---|---|---|---|---|---|---|---|
| Addition of Formaldehyde Solution (1) | | Consumption of Chlorite (2) | | Mole Ratio $(CH_2O+PhOH)$: $NaClO_2$ | Reaction Time Minutes | Temperature Increased °C. | Analysis of the Treated Waste Water | |
| Conc. % | mMol/l | ml[(1)] | mMol/l | | | | Phenol ppm | $CH_2O$ ppm |
| Heating of the Phenol-/Formaldehyde Containing Waste Water Before Chlorite Addition to 40° C. | | | | | | | | |
| 0.2 | 66 | 46 | 153 | 1 : 2.0 | 31 | 48 | 0 | 0 |
| 0.1 | 33 | 23 | 76 | 1 : 1.7 | 29 | 40 | 0 | 0 |

EXAMPLE 5

Waste water samples having a phenol content of 0.05% were treated with the same concentration of formaldehyde in the form of an aqueous 30% formaldehyde solution. Subsequently, there was carried out the addition of the required amount of chlorite solution. The waste water was strongly alkaline through the addition of the chlorite. The pH fell slowly from about 12.0 to 8.5 as the formation of chlorine dioxide began. Consequently, the total reaction time until complete elimination of phenol and formaldehyde was correspondingly long.

A further shortening of the reaction time results again by heating the waste water to 45°–50° C. before addition of the chlorite solution.

In all three cases with trivial increase in temperature there could be produced total elimination of the phenol; the still present residual content of formaldehyde was extremely low and is meaningless for practical purposes.

The results are set forth in the following table.

EXAMPLE 7

1000 ml of waste water containing 0.01% (100 ppm) of phenol and formaldehyde corresponding to the molar ratio $(CH_2O+\text{phenol})$ to chlorite of 1:1.5 was mixed with 2 ml of chlorite (30%) and heated to 50° C. The chlorine dioxide generation set in after 7 hours. After standing for 1 day, the yellow colored waste water was decolorized by the action for 15 minutes of 1% decolorizing carbon. The filtrate was free from phenol and formaldehyde.

In a further formulation, waste water of the previously given concentration of phenol and formaldehyde was adjusted by means of hydrochloric acid to a pH of 6.8 and likewise heated to 50° C. Already after two hours chlorine dioxide formation took place. After a chlorine dioxide action time of three hours, i.e., after a total reaction time of five hours, the analysis of the waste water treated with decolorizing carbon showed that phenol was no longer present and of formaldehyde merely a trace (37 ppm).

In a third formulation the waste water after addition

| Waste Water with a Phenol Content of 0.05% (5.3 mMol/1) | | | | | | | | |
|---|---|---|---|---|---|---|---|---|
| Addition of Formaldehyde Solution (1) | | Consumption of Chlorite (2) | | Mole Ratio $(CH_2O+PhOH)$ : $NaClO_2$ | Reaction Time Minutes | Analysis of the Treated Waste Water | | Remarks |
| Conc. % | mMol/L | ml[(1)] | mMol/1 | | | Phenol ppm | $Ch_2O$ ppm | |
| 0.05 | 16.6 | 9 | 29.8 | 1 : 1.3 | 1200 | 0 | 23 | strongly alkaline |
| 0.05 | 16.6 | 9 | 29.8 | 1 : 1.3 | 170 | 0 | 180 | adjusted to pH 7.0 |
| 0.05 | 16.6 | 9 | 19.8 | 1 : 1.3 | 75 | 0 | 50 | heated to 40°–45° C. before chlorite addition |

EXAMPLE 6

Waste water with a phenol content of 1% (10,000 ppm) was treated with an amount of 30% formaldehyde solution corresponding to the concentration of the phenol. The molar ratio (phenol+formaldehyde) to chlorite was 1:1.5.

Per liter of waste water there were added 200 ml of sodium chlorite (30%) distributed in 3 portions in periodic intervals of 10 minutes. After the third addition strong chlorine dioxide was generated, which however, remained dissolved. The temperature increased up to 65° C. Inside 90 minutes the oxidation was ended. The subsequent treatment with 2–3% of decolorizing carbon resulted in a waste water completely free from phenol and formaldehyde.

of the chlorite solution was neutralized and allowed to stand at room temperature. After 4–6 hours evolution of chlorine dioxide began. After standing for 1 day the waste water was free from phenol and contained only traces of formaldehyde (40 ppm).

EXAMPLE 8

In a larger series of experiments waste water with phenol contents of 0.01 to 1.0% were treated according to the previously described procedure wherein the formaldehyde concentration corresponded to the respective phenol concentration. The addition of the 30% sodium chlorite solution corresponded to the molar ratio $(CH_2+\text{phenol}):NaClO_2$ as 1:1.5. At low phenol concentrations of 0.01 to 0.1% the samples were heated to 45°–50° C. before addition of the chlorite solution; parallel thereto samples of the same concentrations were neutralized and allowed to stand at normal temperature. The following table sets forth results.

| Phenol-Conc. | | CH₂O-Conc. | | Consumption of Chlorite[1] | | Reaction Time | Temperature Increased To | Analysis of the Treated Waste Water | | Remarks |
|---|---|---|---|---|---|---|---|---|---|---|
| % | mMol/l | % | mMol/l | ml[2] | mMol/l | Minutes | °C. | Phenol ppm | CH₂O ppm | |
| 1.0 | 106 | 1.0 | 333 | 199 | 658 | 98 | 69 | <5 | 0 | |
| 0.8 | 85 | 0.8 | 266 | 159 | 526 | 99 | 61 | <5 | 0 | |
| 0.5 | 53 | 0.5 | 166 | 99 | 328 | 104 | 44 | <5 | 0 | |
| 0.2 | 21 | 0.2 | 67 | 40 | 132 | 137 | 29 | 0 | 10 | |
| 0.1 | 10.6 | 0.1 | 33.3 | 20 | 66 | 112 | — | 0 | 0 | Heating of the samples before chlorite addition to 45°–50° C. |
| 0.05 | 5.3 | 0.05 | 16.6 | 10 | 33 | 147 | — | 0 | <10 | |
| 0.01 | 1.1 | 0.01 | 3.3 | 2 | 6.6 | 24 hr. | — | | <10 | |
| 0.1 | 10.6 | 0.1 | 33.3 | 20 | 66 | 16–18 hr. | — | <5 | 130 | Neutralization of the sample after chlorite addition normal temp. |
| 0.05 | 5.3 | 0.05 | 16.6 | 10 | 33 | 16–18 hr. | — | <5 | 95 | |
| 0.01 | 1.1 | 0.01 | 3.3 | 2 | 6.6 | 16–18 hr. | — | <5 | 47 | |

[1]30% Sodium Chlorite solution
[2]amount of additive based on 1l waste water

From the table it can be seen that at phenol concentrations of 0.02% and higher the total time of reaction is finished within 2 or a maximum of 2½ hours. After this time the phenol and formaldehyde were practically completely eliminated.

At lower concentrations of 0.1% and less the total reaction time in the heating of the formulation to 45°–50° was distinctly long, that is the longer the time the lower was the phenol concentration. Here also a complete elimination of phenol and formaldehyde was produced.

The parallel formulation in which the heating was not employed and the chlorine dioxide generation accelerated by neutralization led to the formation of chlorine dioxide at the phenol concentration of 0.1% already after 20 minutes, at 0.05% phenol after 50 minutes, at the lowest concentration of phenol of 0.01% after 3½ hours. After 16–18 hours at normal temperature the phenol was practically completely eliminated; insignificant residual amounts of formaldehyde between 50–130 ppm were established.

EXAMPLE 9

An industrial waste water occurring in the production of phenol-formaldehyde synthetic resin having a weak yellowish brown color with a definite phenol odor had the following characteristic data:
pH:4.0
formaldehyde content:6.7%
phenol content:2.7%

The waste water was diluted with fresh water so that the subsequent reaction after addition of sodium chlorite could run moderately. After the dilution, the waste water had the following characteristic data:
phenol content:0.54%
formaldehyde content:1.35%

Corresponding to the molar ratio ($CH_2O$+phenol):$NaClO_2$=1:1.5, there was added 30% sodium chlorite solution. Chlorine dioxide generation had taken place after 12 minutes; the temperature increased to 68° C. After 1½ hours of reaction and treatment with 2% decolorizing carbon the waste water was completely free from phenol and formaldehyde.

An analogous formulation was heated with an amount of sodium chloride which corresponds to the molar ratio ($CH_2O$+phenol:$NaClO_2$=1:1.3. The course of the reaction was the same as previously described; after the treatment with 2% decolorizing carbon the treated waste water was completely free of phenol. There was found 0.02% of formaldehyde. From the results it is seen that it is suitable to use an amount of chlorite which corresponds to the stated molar ratio of 1:1.5.

By way of comparison this diluted waste water with the previously given phenol and formaldehyde content was also treated with activated carbon to adsorb the phenol. The carbon was pulverized to improve adsorption performance. There were added both 3% and 5% of this activated carbon based on the amount of waste water. After a time of reaction of three hours with the 3% carbon there were still found 925 ppm of phenol, with 5% carbon 380 ppm of phenol. The original formaldehyde concentration had not changed.

A still stronger dilution of this waste water which resulted in a phenol content of only 0.27% was likewise treated with 3% of the mentioned adsorption carbon. After three hours time of reaction the phenol content was only reduced to 20 ppm. The formaldehyde content, however, was unchanged.

From these comparison experiments it can be seen that there can be produced with activated carbon at relatively low starting concentrations of phenol a substantial but not complete dephenolization and that in a waste water which also still contains formaldehyde, this likewise toxically acting substance cannot be eliminated.

EXAMPLE 10

A further waste water smelling weakly of phenol of yellowish-green coloration and weak turbidity had the following characteristic data:
pH:9.0%
free formaldehyde:0.008%
bound formaldehyde:0.04%
phenol content:0.1%

Because of the low formaldehyde content there was added to the sample to be treated a small amount of 30% formaldehyde solution so that the formaldehyde content amounted to about 0.15%. Subsequently, it was mixed with an amount of 30% sodium chlorite solution so that the molar ratio ($CH_2O$+phenol):$NaClO_2$=1:1.5. After about 25 minutes chlorine dioxide was generated, the temperature increased to exactly 30° C. The action of the chlorine dioxide lasted for three hours. Through after treatment with 1% decolorizing carbon a clear, colorless water was obtained. The analysis showed a phenol content of <5 ppm and a formaldehyde content of 15 ppm.

A comparable treatment of the waste water with 3% activated carbon after a time of action of three hours showed a residual content of phenol of 45 ppm; the formaldehyde content remained unchanged. Even at the lower starting concentration of phenol it was not possible in this case to make a residue free dephenolization with activated carbon, just as little could the formaldehyde be eliminated.

EXAMPLE 11

Waste water samples with phenol contents of 0.1%, 0.2% and 0.5% were treated with 1, 3 and 5% of pulverized activated carbon at room temperature and in the hot at 45° C. during a time of three hours.

After filtering off the carbon there were found in the samples residual amounts of phenol between 10 and 1200 ppm. Even the sample with the lowest starting concentration of 0.1% phenol could not be dephenolized without residue with heat treatment at 45° C. with 3% activated carbon. With higher phenol contents beginning with 0.2% despite the increased addition of activated carbon of more than 3% it was not possible to remove the phenol.

EXAMPLE 12

In comparison formulations waste water samples with 0.1 and 0.5% phenol were acidified with hydrochloric acid and sulfuric acid (pH about 1) and subsequently treated with 30% sodium chlorite solution, but without addition of formaldehyde. There were used 1.5 and 1.9 moles of $NaClO_2$ per mole of phenol. Chlorine dioxide was immediately developed. The entire time of action of the chlorine dioxide was between 3 and 5 hours.

The gas chromatographic analysis of the waste water samples after activated carbon treatment showed there was still a phenol content of 16 ppm at the lowest starting concentration of 0.1% phenol and 46 to 90 ppm phenol at the higher starting concentration of 0.5%. Besides the gas chromatogram contained in addition to the phenol peak other foreign peaks of unclear identity.

In further formulations waste water samples containing 0.5% phenol and 0.5% formaldehyde were strongly acidified (pH value of about 1) and subsequently treated with 30% sodium chlorite solution corresponding to a molar ratio $(CH_2O+phenol):NaClO_2=1:1.5$. Here also after addition of the chlorite there immediately took place development of chlorine dioxide. After a time of action of the chlorine dioxide of 3 to 4 hours and subsequent treatment with activated carbon in the gas chromatogram of the treated samples there were established besides still present phenol likewise foreign peaks as in the previously described formulations without formaldehyde.

A comparison formulation with the same starting concentration of phenol and formaldehyde of 0.5% each, but without addition of acid in which the addition of 30% sodium chlorite corresponded to the same molar ratio $(phenol+CH_2O):NaClO_2=1:1.5$ yielded a different result.

Already after 90 minutes reaction time and subsequent activated carbon treatment in the treated samples both phenol and formaldehyde were completely eliminated. Foreign peaks no longer occurred in the gas chromatograph.

What is claimed is:

1. In a process for purifying waste water containing phenol with chlorine dioxide, the improvement comprising treating the waste water with alkali or alkaline earth metal chlorite in the presence of formaldehyde, the weight ratio of formaldehyde to phenol being between 0.5 to 2:1 and the molar ratio of the sum of phenol+formaldehyde to chlorite being between 1:1.2 to 1:2 when the chlorite is an alkali metal chlorite and being between 1:0.6 to 1:1 when the chlorite is an alkaline earth metal chlorite whereupon the treated waste water is decolorized.

2. The process of claim 1 wherein the chlorite is sodium chlorite, potassium chlorite or calcium chlorite.

3. The process of claim 2 wherein the chlorite is sodium chlorite.

4. The process of claim 1 wherein after treating the waste water with the chlorite it is treated with decolorizing carbon.

5. The process of claim 4 wherein the chlorite is added at a rate that the chlorine dioxide formed does not exceed the limit of solubility and does not escape as gas.

6. The process of claim 5 wherein the pH of the waste water is maintained at 4.5 to 9 during the treatment.

7. The process of claim 6 wherein the pH of the waste water is maintained at 5 to 8 during the treatment, the weight ratio of phenol to formaldehyde is 1:1 and the molar ratio of the sum of phenol+formaldehyde to chlorite is 1:1.5 when the chlorite is sodium chlorite or potassium chlorite and is 1:0.75 when the chlorite is calcium chlorite.

8. The process of claim 7 wherein the chlorite is sodium chlorite.

9. The process of claim 4 wherein the weight ratio of phenol to formaldehyde is 1:1.

10. The process of claim 4 wherein the molar ratio of the sum of phenol+formaldehyde to chlorite is 1:1.5 when the chlorite is sodium or potassium chlorite and is 1:0.75 when the chlorite is calcium chlorite.

11. The process of claim 1 wherein the improvement consists essentially of treating the waste water with alkali or alkaline earth metal chlorite in the presence of formaldehyde, the weight ratio of formaldehyde to phenol being between 0.5 to 2:1 and the molar ratio of the sum of phenol+formaldehyde to chlorite being between 1:1.2 to 1:2 when the chlorite is an alkali metal chlorite and being between 1:0.6 to 1:1 when the chlorite is an alkaline earth metal chlorite whereupon the treated waste water is decolorized.

12. The process of claim 1 wherein the improvement consists of treating the waste water with alkali or alkaline earth metal chlorite in the presence of formaldehyde, the weight ratio of formaldehyde to phenol being between 0.5 to 2:1 and the molar ratio of the sum of phenol+formaldehyde to chlorite being between 1:1.2 to 1:2 when the chlorite is an alkali metal chlorite and being between 1:0.6 to 1:1 when the chlorite is an alkaline earth metal chlorite whereupon the treated waste water is decolorized.

* * * * *